United States Patent

[11] 3,542,072

[72] Inventors Rano J. Harris, Sr.;
Rano J. Harris, Jr., Baton Rouge,
Louisiana
[21] Appl. No. 740,700
[22] Filed June 27, 1968
[45] Patented Nov. 24, 1970
[73] Assignee Precision Sampling Corporation
a corporation of Louisiana

[54] VALVE
10 Claims, 5 Drawing Figs.
[52] U.S. Cl. .................................................. 137/625.47,
251/172
[51] Int. Cl. ...................................................... F16k 25/00
[50] Field of Search ........................................ 251/172,
192; 137/246.22, 625.47

[56] References Cited
UNITED STATES PATENTS
1,990,309 2/1935 Phillips ........................ 137/246.22
3,131,706 5/1964 Harban ........................ 137/625.47X
3,263,697 8/1966 Reed et al. ................... 251/317X Primary Examiner—M. Cary Nelson
Assistant Examiner—Michael O. Sturm
Attorney—Llewellyn A. Proctor ABSTRACT: A valve assembly comprising a set of cooperating telescoping members, including in their telescoped position an outer tubular member, an intermediate tubular member, and an inner member or stem. In place, the outer and intermediate tubular members are positioned in fixed relationship, one to the other. The position of the innermost member or stem is changeable with respect to the other members (i.e., is rotatable therein) and each is provided with corresponding lateral openings in fixed communication for passage of fluid delivered therethrough. In a preferred embodiment, the members are provided with pairs of lateral openings for operative communication, the mid portions of the openings through the inner member or stem being displaced one from the other to avoid intersection, while the entry and exit features thereof lie on a common plane for connection with the lateral openings of the outer and intermediate tubular members. The intermediate tubular member is constructed of semirigid, flexible or semiflexible material and the lateral openings thereof communicate through physically contacting surfaces, or lands, at the interface of the two members. A tap is provided within the outer member for passage of pressurized fluid into the lower surface areas, or voids, surrounding the contact portions, or lands, of the said tubular members whereby the walls beneath the lower surface areas can be pressed inwardly against the innermost member or stem to effectively seal the valve against leakage.

Patented Nov. 24, 1970

INVENTORS
RANO J. HARRIS, SR.
RANO J. HARRIS, JR.

BY Llewellyn C. Proctor
ATTORNEY

INVENTORS
RANO J. HARRIS, SR.
RANO J. HARRIS, JR.
BY
ATTORNEY

VALVE

It is often the present practice in many valve assemblies to provide two cooperating members, a first member provided with an internal opening communicated with a conduit for conveying fluid, and a second member provided with a lateral opening, located therein, so that rotation of the said second member in one direction will align the lateral openings of the two members to permit passage of fluid, while misalignment of the lateral openings by rotation of the said member in another direction will close off the flow of fluid.

Such structure, common to on–off valves, is quite simple and easily fabricated. It is suited to many common operations but, unfortunately, is not suitable for the accurate quantitative delivery of fluids as is necessary in precise analytical determinations. Modern technology often requires an accurately measured sample of a particular fluid for analysis. Leakage of fluid often occurs, particularly where the system is under considerable pressures or at elevated temperatures, or both.

Accordingly, it is a primary object of the present invention to obviate these and other prior art difficulties. In particular, it is an object to provide a valve assembly with a sealing feature which permits passing fluids with high precision, even when the delivered fluid is passed at high temperatures and pressures.

These and other objects are achieved in accordance with the present invention, a valve assembly comprising, in combination: a set of cooperating telescoping members including, in their telescoped position, an outer tubular member, an intermediate tubular member, and an inner member, or stem. The outer and intermediate tubular members cooperate one with the other to form a subassembly having a sealing feature for preventing leakage or loss of a delivered fluid into the interstices or annular spaces between the intermediate and inner member as the latter is rotated to open and close, or redirect the flow of delivered fluid through the valve.

In place, the outer and intermediate tubular members of the subassembly are positioned in fixed relationship, one member to the other, and each is provided with corresponding lateral openings in fixed communication for delivery of fluid from the lateral openings of the intermediate member through the lateral openings of the outer member. The intermediate tubular member is constructed of semirigid, semiflexible or flexible material. The lateral openings between the outer and intermediate tubular members pass through close or contiguous surfaces and a void or space is provided around these contact surfaces for application of pressurized fluid to force the semirigid, intermediate tubular member inwardly into a snug and sealing contact with the inner member, or stem. Preferably, the external surface of the intermediate member is provided with lands or raised areas and isolated interconnected low areas, or voids, which surround the lands. A line is provided within the outer member, and communicated with the low areas for injecting pressurized fluid therein to force the intermediate member inwardly to produce a sealing effect between the intersections of the several lateral openings on rotation of the inner member to initiate, redirect, or cut off the flow of delivered fluid passing through the valve.

The invention and its principle of operation will be better understood by reference to the following detailed description and to the FIGS. to which reference is made in the description. In the description where subscripts are used in common with whole corresponding numbers, the whole numbers are used in generic sense and subscripts are used where there is a plurality of similar parts or components.

In the drawings

Figure 1:
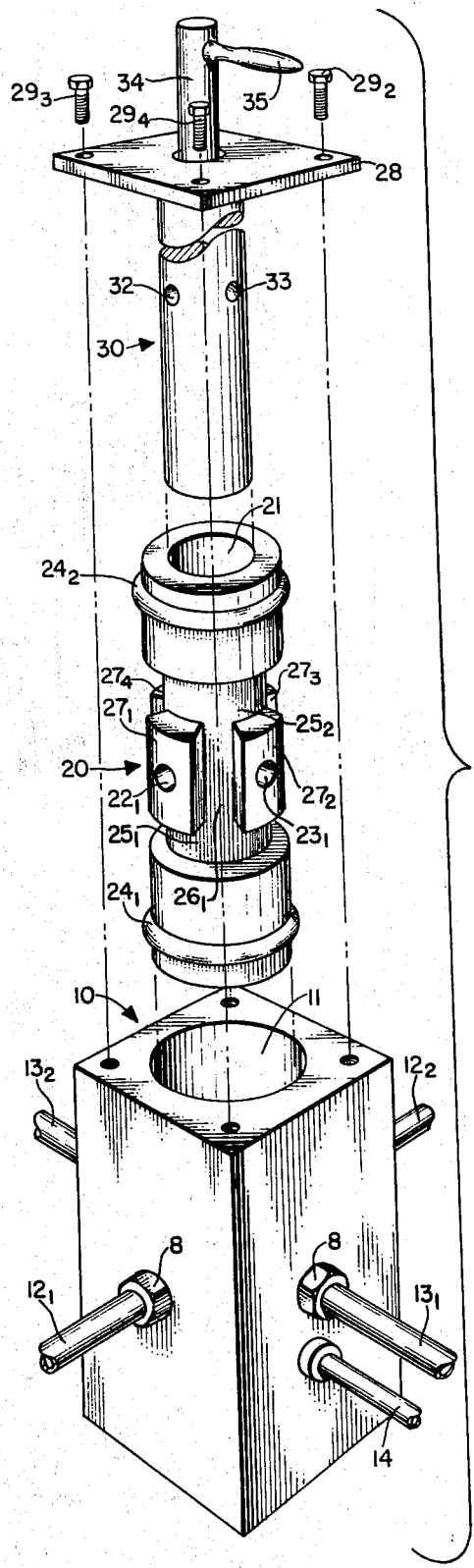
FIG. 1 is an exploded or disassembled view of basic units, two outer units for forming a valve body and seal for cooperation with the innermost member or stem, constituting in this instance a sampling valve in accordance with the present invention.
Figure 2:
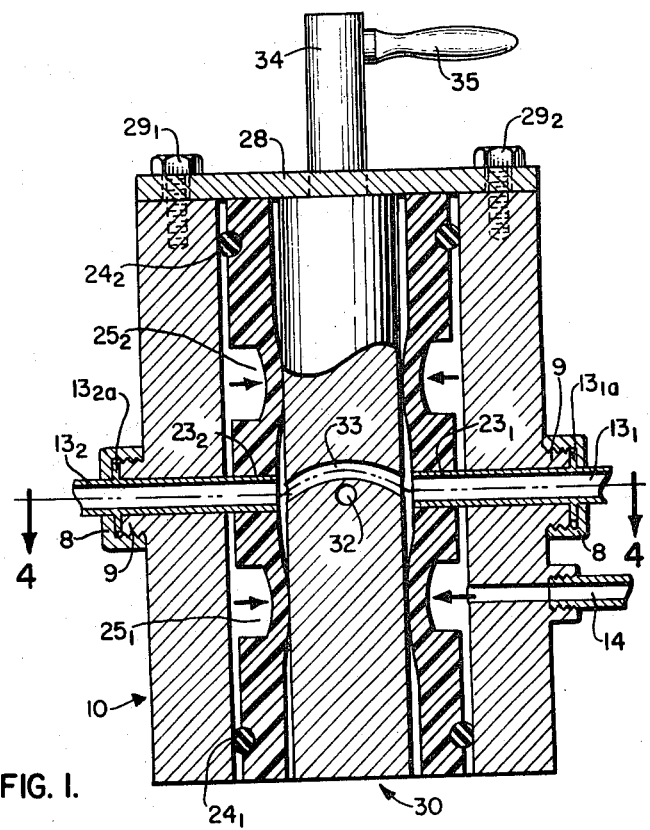
FIG. 2 and 3 are section and fragmentary sectional views, respectively, of the basic units of the foregoing figure disposed or telescoped in cooperating relationship.
Figure 3:
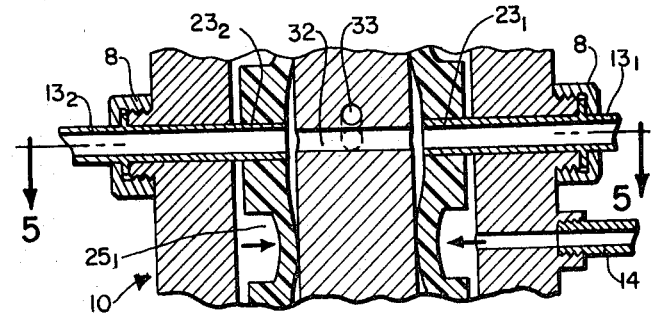

Referring to FIG. 1, there is shown generally three cooperating members, viz., an outer and generally tubular member 10, an intermediate tubular member 20 and a cylindrical inner member 30. The member 10 is provided with an axial bore 11 of substantially the same internal diameter as the external diameter of tubular member 20 so that the latter can be snugly coaxially fitted within the bore 11. Tubular members 10,20, as will be explained, constitute a subassembly, the member 20 providing a seal which prevents escape of a fluid delivered through the valve assembly on rotation of the cooperating inner cylindrical member or stem 30. Cylindrical member 30 is thus of sufficient external diameter that it in turn can be coaxially fitted within the axial bore or internal opening 21 of tubular member 20. Telescoped in place, these members 10,20,30 constitute a valve assembly.... viz., an outer subassembly composed of member 10,20 (which can be made as a unitary component) and a cooperating inner member or stem 30.

Each of the three members 10,20,30 is provided with lateral pairs of openings.... viz., 12,13 (member 10), 22,23 (member 20), 32,33 (member 30). In assembly, one pair of openings 12 ($12_1,12_2$) in the outer member 10 corresponds and communicates with a pair of openings 22 ($22_1,22_2$) in intermediate tubular member 20, and another pair of openings 13 ($13_1,13_2$) in outer member 10 corresponds and communicates with a pair of openings 23 ($23_1,23_2$) in intermediate tubular member 20. The pairs of openings 12,22 and 13,23 are at right angles one to the other. The rotatable inner cylindrical member or stem 30 is provided with a lateral opening 32 and a lateral opening 33 for alternate communication with the pairs of openings 12,22 and 13,23, respectively. By arranging the lateral openings 32,33 of member 30 so that the entry and exit portions thereof lie in the same plane, but yet such that the openings 32,33 are not in direct communication one with the other, a measured fluid specimen can be trapped, and the direction of two simultaneously flowing streams of fluid can be switched, an operation of which shall be discussed hereafter.

The outer member, which can be of virtually any external shape, is provided with pairs of openings 12,13 which extend laterally from the outside surface of member 10 to the bore 11. Tightly fitting conduits are extended through openings $12_1,22_1$; $12_2,22_2$ and through openings $13_1,23_1$; $13_2,23_2$, respectively, to hold these paired openings and members 10,20 in fixed relationship one with regard to the other. This prevents leakage within the annular space between these members. The inlet portions of the conduits $12_1,13_2$ and outlet portions $12_2,13_1$ are extended through externally threaded projections or shanks 9 affixed to the external side of the outer tubular member 10, and internally threaded nuts 8 are screwed down over the stops $12_{1A}$, $12_{2A}$, $13_{1A}$, $13_{2A}$ to hold the conduits in place. The member 10 is also provided with a pressure tap 14 for applying pressure through the member 10 and upon certain portions of tubular member 20 to force the member to bulge inwardly and press tightly against the cylindrical member 30. The pressure tap 14 can be fixed in place by means similar to that used to secure the conduits $12_1,22_1$; $12_2,22_2$; $13_1,231$ and $13_2,23_2$.

The tubular intermediate member 20 is a semirigid, flexible, or partially flexible material, and is conveniently provided with a pair of external circumferential slots or grooves, at least one at each end of the member. O-rings 24($24_1,24_2$) of resilient material are set within these grooves to press tightly against the internal surface of the member 10 and thereby isolate the section lying within these extremes from the exterior. The interior portion of the member 20 is further provided with very wide external grooves 25($25_1,25_2$), these being joined together by the lateral slots or grooves 26($26_1$–$26_4$) to form a relatively thin surface below the low areas of the member. Lands 27($27_1$—$27_4$) project above the adjoining low surface areas 25,26 and each of the lands 27 is individually provided with a separate opening 22($22_1$,$22_2$), 23($23_1$,$23_2$) which extends through the member 20 to the internal opening 21. The openings 22,23 are located in the same plane.

The cylindrical inner member or stem 30 is provided with a pair of lateral openings 32,33 the entry and exit features of which lie on a common plane. The end portions of the openings 33 lie in the same plane as the opening 32, but the midportion thereof is displaced slightly forward of the opening 32 or bent around the latter so that there is no intersection. In other words, the entry and exit features of openings 32,33 lie in the same plane. The cylindrical member 30 is provided with a shank 34, or portion of reduced diameter, through which is secured a pin or handle 35. An end plate 28, with retaining screws 29($29_1$—$29_4$) can be employed to prevent the stem 30 from sliding out of the valve assembly. A similar end plate (not shown) could be located at the opposite end of the assembly. O-rings or gasket materials (not shown) could be employed in either of these end plates as secondary seals.

A key and novel feature of the invention relates to the subassembly formed by outer and intermediate tubular members 10,20 (which can be a unitary component) and the cooperation thereof with the inner member or stem 30. In assembly, the outer and intermediate members 10,20 and the communicating pairs of openings 12,22 and 13,23 are positioned in fixed relationship one to the other. In between these members, however, there is provided an isolated annular void or space having low areas 25,26 into which pressurized or hydraulic fluid can be injected to press the member 20 tightly against the member or stem 30, especially at primary or specific locations to produce a seal which prevents leaks, as fluid is transferred through the valve, even when the transfer of fluid is made at high pressures and temperatures. In operation, pressure, which is readily maintained and preserved because of the presence of the sealing O-rings 24, is constantly exerted upon the relatively thin surfaces 25,26 via application of, e.g., pneumatic or hydraulic pressure through the pressure tap 14. The relatively thin surfaces 25,26 are forced down tightly against the exterior surface of stem 30. Fluid, for this reason, cannot escape across the interface or within the annulus between the external surface of stem 30 and the internal surface of the tubular member 20.

Figure 4:
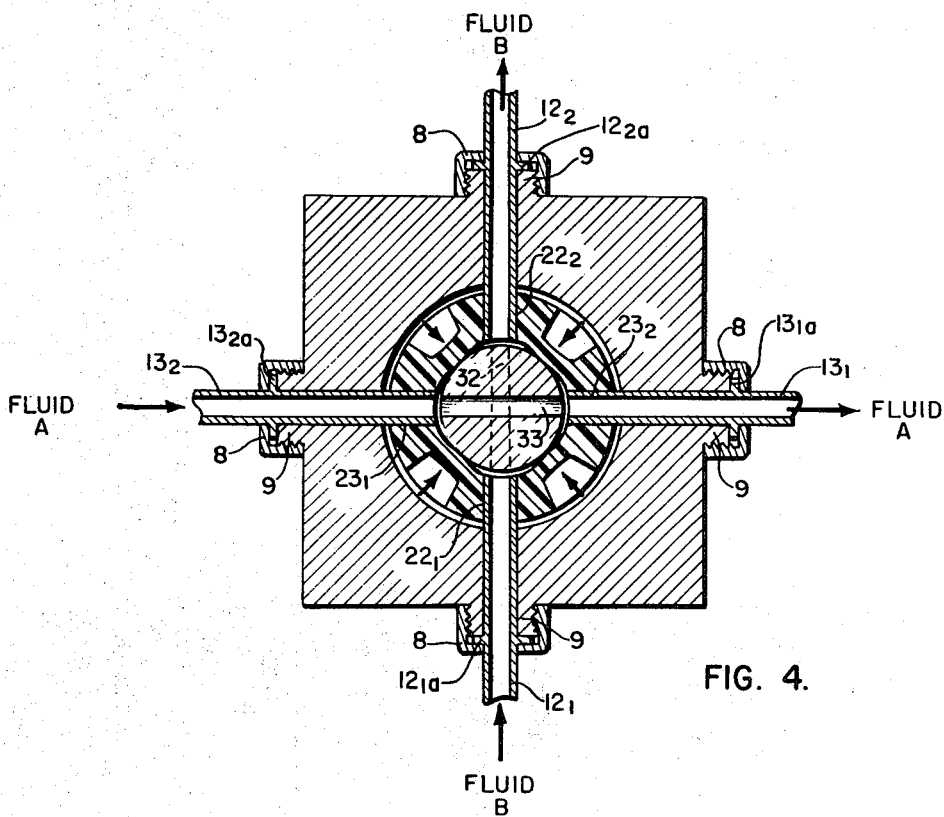
FIG. 4 is a partial section 4–4 of FIG. 2 showing the valve in a first sample collecting position.

Referring specifically to FIG. 4, the assembled valve is shown in a first position. Fluids, e.g., a gas A and a liquid B, are passed through the valve via passage through the pairs of continuous conduits formed by openings A 13,23,33 and B 12,22,32, respectively. Simultaneously, with the passage of fluids, pressure is exerted on the surfaces 25,26 of member 20 as indicated by the closed arrows. Because of the tight contact between the internal side of member 20 and the external surface of member 30, particularly at the locations surrounding the openings, there is no leakage of fluids A and B across and between the interfaces.

Figure 5:
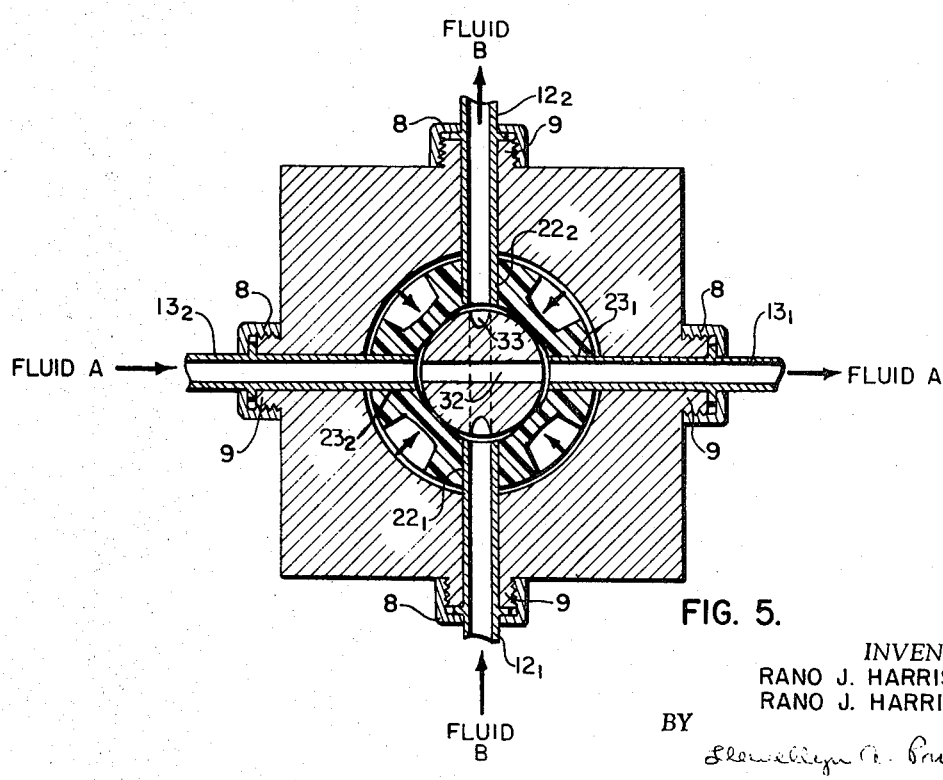
FIG. 5 is a partial section 5–5 of FIG. 3 showing a second sample delivery position causing, in this instance, a switching of the flowing fluid streams from one delivery conduit to the other and vice versa.

Referring specifically to FIG. 5, the valve is shown in a second position. Upon rotation of the stem 30 through a 90° angle, as by movement of handle 35, the position of the contiguous pairs of conduits A and B, supra, are reversed so that fluids A and B flow through conduits 13,23,32 and 12,22,33, respectively. In other words, in the first position, as demonstrated by FIG. 4, the delivered gas A flows continuously through 13,23,33 while the delivered liquid B flows continuously through 12,22,32 as to a gas chromatograph. On rotation of stem 30, a measured specimen of liquid B is trapped within the segment of conduit 32 of stem 30 and then injected into the gas chromatograph by action of gas A which pushes the liquid B out of the segment of conduit 32 via conduit sections $13_1$, $23_1$.

The outer member 10 and stem 30 can be constructed of conventional valve materials, preferably metals such as brass, bronze, chrome, ferrous metals, stainless steel and the like. The tubular member 20 must be constructed of a semirigid and somewhat flexible material, i.e., one that will yield to some extent upon exertion of pressure thereon to tighten down upon the stem 30. Suitably, the tubular member 30 is constructed of hard rubber, natural or synthetic, e.g., neoprene, isoprene, chloroprene, and various plastics and plastic like materials, e.g., nylon, and conventional gasket and diaphragm materials. Preferably, these are kept well lubricated so that the stem 30 can be turned without undue force.

The semirigid self-lubricated plastics are especially preferred for use in the construction of the member 20. The polyfluorinated ethylene polymers, notable among which is polytetrafluoroethylene (Teflon), is particularly outstanding. This material is easily shaped, prepared and conditioned for use, and there is no necessity for additional lubrication. If desired, the members 10,20 can be constructed as a unitary assembly. A unitary subassembly composed entirely of Teflon has been found particularly adaptable and well suited for cooperation with a metal stem 30.

Numerous modifications can be made without departing the spirit and scope of the invention. For example, though only a single valve unit has been described, it is quite feasible to employ a repeating number of such units. A multiport valve can be conveniently constructed, e.g., by providing a plurality of members 10,20 in tandem relationship, one combination with another, these units being individually activated for passage of fluids therethrough by rotation of a single stem, suitably perforated at the desired locations. Moreover, whereas the valve described passes two fluids simultaneously, it is apparent that one fluid or even a greater number of fluids can be employed or arrangements can be made for switching directions of flow. These and other forms of valves are readily adapted to the same sealing principle of operation.

We claim:
1. A valve comprising:
   a set of cooperating telescoped members including an outer tubular member, an intermediate, semirigid tubular member and a rotatable inner member;
   lateral openings through each of the members, the lateral openings through the walls of the outer and intermediate tubular members communicating the exterior surface of the respective member and its axial bore;
   a subassembly formed by fixing the outer tubular member and intermediate semirigid tubular member, and the lateral openings thereof, in fixed relationship one member with regard to the other;
   lands formed on the surface of the intermediate tubular member by surrounding continuous low lying areas, the lands providing contact surfaces between the outer and intermediate tubular members at the location of passage of the communicating lateral openings;
   a continuous void between the walls of the outer and intermediate tubular members formed by the continuous low lying areas surrounding the lands of the intermediate member; and
   a pressure tap within the outer tubular member for transmitting pressurized fluid into the void between the outer and intermediate tubular members to force the walls of the intermediate semirigid tubular member beneath the low lying areas inwardly into snug contact with the inner member, the said rotatable inner member being axially disposed within the bore of the intermediate tubular member so that on rotation the lateral opening thereof can be brought into and out of communication with the lateral openings of the said subassembly whereby a delivered fluid can be passed from a supply source through the lateral openings between the subassembly and inner member without leakage due to the sealing effect produced by the pressure exerted through the wall of the intermediate tubular member upon the inner member.
2. The apparatus of claim 1 wherein the intermediate semirigid tubular member is a self-lubricating type of plastic.
3. The apparatus of claim 2 wherein the plastic is Teflon.

4. The apparatus of claim 1 wherein the subassembly formed by the outer and intermediate tubular members is formed by passage of continuous sections of conduit through the lateral openings to connect the exterior surface of the outer tubular member within the axial bore through the intermediate tubular member.

5. The apparatus of claim 1 wherein the intermediate tubular member is Teflon and the outer and inner members are metal.

6. The apparatus of claim 1 wherein the subassembly is provided with a plurality of lateral openings and a corresponding number of matching lateral openings within the inner rotatable member.

7. The apparatus of claim 6 wherein both the subassembly and the inner members are provided with a pair of lateral openings, the mid portion of the lateral openings through the inner member being displaced one opening from the other so that there is no intersection while the entry and exit features lie on a common plane with the plane formed by the pair of lateral openings of the subassembly, whereby a portion of fluid flowing through one set of contiguous openings of the subassembly can be trapped within a lateral opening through the inner member and then displaced through the other contiguous opening of the subassembly by rotation of the inner member to align the openings.

8. The apparatus of claim 7 wherein the lateral openings of the subassembly, and the entry and exit features of the openings through the inner member are disposed at right angles one to the other.

9. The apparatus of claim 8 wherein the inner member is provided with a handle to facilitate its rotation within the subassembly.

10. The apparatus of claim 1 wherein the structure described is one of a repeating number of subassembly units, interconnected one with the other through a single inner member extending through all of the units.